United States Patent [19]

Wathieu

[11] Patent Number: 5,765,460
[45] Date of Patent: Jun. 16, 1998

[54] PAPER CUTTER FOR VARIABLE FORMAT

[76] Inventor: Patrick Wathieu, 31 Rue Bois Eloi, B-1380, Lasne, Belgium

[21] Appl. No.: 768,526

[22] Filed: Dec. 18, 1996

Related U.S. Application Data

[63] Continuation-in-part of Ser. No. 574,355, Dec. 18, 1995, abandoned.

[51] Int. Cl.$^6$ ............................................. B26D 5/00
[52] U.S. Cl. ........................... 83/37; 83/74; 83/311; 83/312; 83/364; 83/371
[58] Field of Search .................. 83/37, 72, 74, 83/76, 76.9, 298, 367, 368, 371, 311, 312, 364, 365

[56] References Cited

U.S. PATENT DOCUMENTS

| | | | |
|---|---|---|---|
| 1,946,457 | 2/1934 | Donnelley et al. | 164/68 |
| 2,108,410 | 2/1938 | Perry | 242/45 |
| 2,576,529 | 11/1951 | McKenney et al. | 271/2.6 |
| 2,877,846 | 3/1959 | Tobey | 164/49 |
| 2,971,414 | 1/1961 | Owen | 83/75 |
| 3,000,250 | 9/1961 | Altmann et al. | 83/341 |
| 3,094,027 | 6/1963 | Alexander et al. | 83/37 |
| 3,105,405 | 10/1963 | Bessony | 83/75 |
| 3,143,017 | 8/1964 | Donnell | 83/211 |
| 3,169,432 | 2/1965 | Hoffman et al. | 83/362 |
| 3,401,585 | 9/1968 | Schmermund | 83/341 |
| 3,543,620 | 12/1970 | Hilsenbeck | 83/37 |
| 3,543,624 | 12/1970 | Richards | 83/288 |

(List continued on next page.)

FOREIGN PATENT DOCUMENTS

| | | |
|---|---|---|
| 0224731 | 6/1987 | European Pat. Off. |
| 0 279 654 | 8/1988 | European Pat. Off. |
| 0 707 928 A1 | 4/1996 | European Pat. Off. |
| 2120328 | 8/1972 | France |
| 933 010 | 9/1955 | Germany |
| 1 922 105 | 5/1971 | Germany |
| 2613039 | 10/1977 | Germany |
| 3521238 A1 | 12/1986 | Germany |
| 51-22178 | 2/1976 | Japan |
| 51-51084 | 5/1976 | Japan |

(List continued on next page.)

OTHER PUBLICATIONS

Siemans Publication, New Risc Processor Control for Direct Drive.
Research Disclosure, Trissell Engineering Limited, 1977.

*Primary Examiner*—Eugenia Jones
*Attorney, Agent, or Firm*—Fields and Johnson, P.C.

[57] ABSTRACT

A method and apparatus is provided for selectively cutting sheets of paper of variable length from a paper supply having a continuous web moving from an upstream location to a downstream location through a pair of pinch rollers and along a predetermined path to a rotary cutter. A controller controls the rotation of the rotary cutter. First and second sensors sense the angular positions of the rotary cutter and pinch rollers, respectively, to provide respective input signals to the controller indicative thereof. A format selector, controlled by an operator, provides a third input signal to the controller indicative of the speed and format for cutting individual sheets from the web. The controller is responsive to the first, second and third signals so that the rotary cutter cuts the sheets to the desired length and the pinch rollers feed the web at a desired speed. Optical sensors sense the position of the end of the web and the position of indicia on the web and provide further input signals to the controller so that precise cuts can be made with respect to the position of the indicia for each cut sheet of paper. Alternatively, a sensor on a positive feed mechanism senses the position of the web. Substantially instantaneous corrections in the speed of the cutter rotary is made to compensate for variations in the diameter of the pinch roller and to make changes on the fly to initiate a new format in response to a signal from an optical recognition mark (ORM) on the web. A stop signal from the Z channel of the rotary cutter can be used to stop the rotary cutter so that sufficient angular distance remains to accelerate the rotary cutter to the desired speed for the next cut.

4 Claims, 7 Drawing Sheets

U.S. PATENT DOCUMENTS

| | | | |
|---|---|---|---|
| 3,811,768 | 5/1974 | Zahn et al. | 355/29 |
| 3,828,636 | 8/1974 | Smith | 83/341 |
| 3,869,950 | 3/1975 | Serra | 83/341 |
| 3,945,279 | 3/1976 | Boehme et al. | 83/34 |
| 3,956,954 | 5/1976 | Edwards | 83/285 |
| 3,982,454 | 9/1976 | Schneider et al. | 83/74 |
| 4,119,003 | 10/1978 | Corse | 83/341 |
| 4,183,271 | 1/1980 | Martin | 83/156 |
| 4,194,421 | 3/1980 | Knoll et al. | 83/62.1 |
| 4,201,102 | 5/1980 | Rudszinat | 83/298 |
| 4,255,998 | 3/1981 | Rudszinat | 83/298 |
| 4,287,797 | 9/1981 | Seragnoli | 83/74 |
| 4,293,774 | 10/1981 | Pongracz | 250/548 |
| 4,297,930 | 11/1981 | Putzke | 83/156 |
| 4,356,745 | 11/1982 | Hornung et al. | 83/341 |
| 4,380,940 | 4/1983 | Evans | 83/38 |
| 4,423,925 | 1/1984 | Gnuechtel | 318/603 |
| 4,449,433 | 5/1984 | Miyamoto | 83/76 |
| 4,497,229 | 2/1985 | Carrington et al. | 83/76 |
| 4,519,868 | 5/1985 | Hoffmann | 156/353 |
| 4,618,391 | 10/1986 | Torti et al. | 156/353 |
| 4,664,006 | 5/1987 | Mitchell | 83/341 |
| 4,719,575 | 1/1988 | Gnuechtel | 364/469 |
| 4,721,058 | 1/1988 | Hayamizu et al. | 118/665 |
| 4,781,090 | 11/1988 | Feldkamper et al. | 83/74 |
| 4,896,605 | 1/1990 | Schröder | 101/486 |
| 4,943,341 | 7/1990 | Mattei | 156/517 |
| 5,000,069 | 3/1991 | Knobel | 83/285 |
| 5,000,812 | 3/1991 | Murphy | 156/268 |
| 5,001,952 | 3/1991 | Myogadani | 83/342 |
| 5,095,219 | 3/1992 | Laumann et al. | 250/548 |
| 5,119,725 | 6/1992 | Okamura | 101/226 |
| 5,130,724 | 7/1992 | Crowley | 346/1.1 |
| 5,235,882 | 8/1993 | Rabourn | 83/367 X |
| 5,241,884 | 9/1993 | Smithe et al. | 83/76 |
| 5,257,567 | 11/1993 | Walker et al. | 83/74 |
| 5,359,915 | 11/1994 | Hitz | 83/342 |
| 5,415,092 | 5/1995 | Hern | 101/226 |
| 5,432,586 | 7/1995 | Tokuda | 355/41 |

FOREIGN PATENT DOCUMENTS

| | | |
|---|---|---|
| 51-137189 | 11/1976 | Japan . |
| 52-132482 | 11/1977 | Japan . |
| 54-114882 | 9/1979 | Japan . |
| 55-24843 | 2/1980 | Japan . |
| 57-149193 | 9/1982 | Japan . |
| 60-52919 | 11/1985 | Japan . |
| 61-201795 | 12/1986 | Japan . |
| 64-6233 | 2/1989 | Japan . |
| 5-337729 | 12/1993 | Japan . |
| 7-106556 | 12/1993 | Japan . |
| 1034818 | 7/1966 | United Kingdom . |
| 1298181 | 11/1972 | United Kingdom . |
| 1478208 | 6/1977 | United Kingdom . |
| 1516893 | 7/1978 | United Kingdom . |
| 1520398 | 8/1978 | United Kingdom . |
| 2042961 | 10/1980 | United Kingdom . |
| 2 085 793 | 5/1982 | United Kingdom . |
| 2 180 823 | 4/1987 | United Kingdom . |
| 2187669 | 9/1987 | United Kingdom . |

Fig. 6
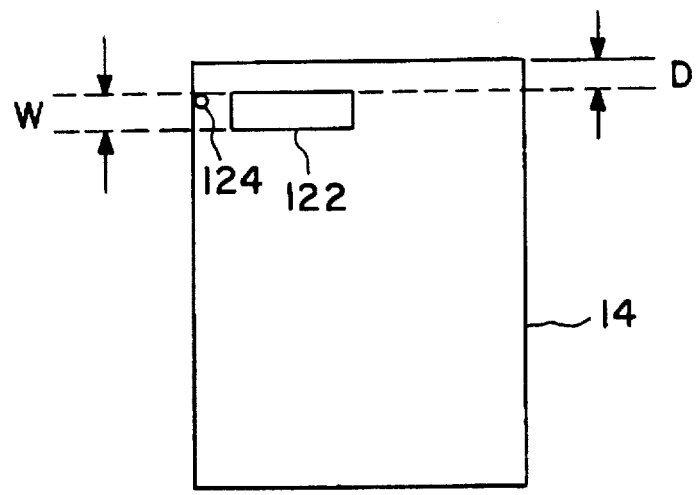
Fig. 7
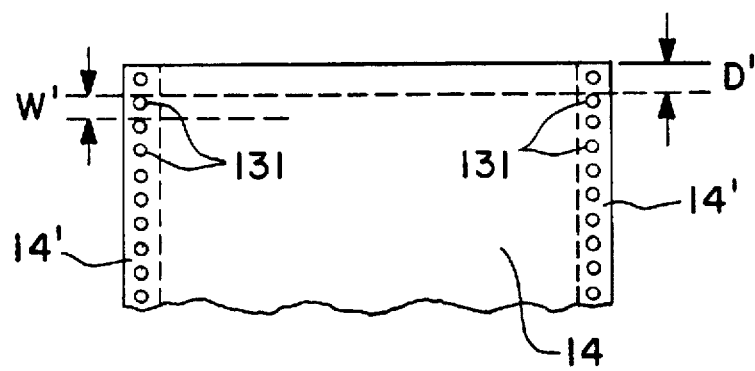
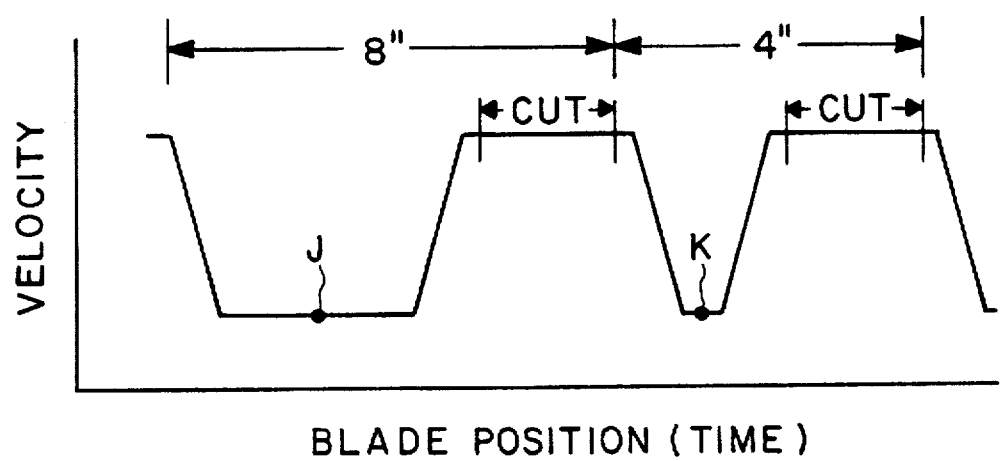
Fig. 8

PAPER CUTTER FOR VARIABLE FORMAT

This application is a continuation-in-part of my application U.S. Ser. No. 08/574,355, filed Dec. 18, 1995 and entitled "Paper Cutter for Variable Format", now abandoned.

TECHNICAL FIELD

This invention relates to a rotary paper cutter and more particularly to a high speed, low inertia rotary cutter whose speed can be rapidly changed to cut sheets of paper from a continuous web into different formats and/or position a cut across the web at a desired location with respect to indicia preprinted on the web.

BACKGROUND ART

In many manufacturing operations it is desirable to cut sheets of paper from a web of paper which is fed from a supply roll. It is desirable that each sheet be cut at equal lengths and that if indicia is preprinted on the sheets that the cuts occur at the same location with respect to the indicia, such as in billing statements, so that each statement is printed at the same position on each sheet of paper. Also, for some purposes, it is desirable to be able to change formats, i.e., the length of the cut sheets. Typically, a run will be made of one size sheet and then the machine will be stopped, reformatted and then restarted to produce a sheet of a different length. However, there are applications where it is desirable to change the length of the sheet "on the fly" so that one sheet can be cut to a first length and a second sheet can be cut to a second length without having to stop the machine. This situation might arise when a series of related documents are preprinted on a single web of paper but are required to be different lengths for their intended purpose. Prior to the present invention, no apparatus has been designed which can change the lengths of cut sheets "on the fly". In particular, one of the primary drawbacks of the prior art is that the changes in format are usually made by changing the gearing and transmission of the machine. However, the required tolerances in the gear and transmission mechanisms create too much unwanted error in the length of the sheets of paper. Furthermore, the change-over time required creates inefficiencies in production.

Typically, the web is fed by pinch rollers from a supply and if there are any variations in the diameter of these pinch rollers due to manufacturing tolerance variances, collective errors in the amount of paper fed will build up with each subsequently fed sheet so that over time the cut no longer occurs at the desired location.

Some apparatus provide for changing format by providing different encoder mechanisms for sensing the position of the pinch rollers and the rotary cutter. While these are functionally suitable for their intended purpose, the shut-down time and labor involved increases costs and is unacceptable for many applications. Furthermore, as mentioned above, it is not possible to change formats "on the fly".

U.S. Pat. No. 4,449,433 to Miyamoto discloses a cutting device for a tag printer wherein a rotary blade is rotated continuously through a differential gear mechanism by a first motor. Its cutting timing is corrected by a second motor which is connected to a differential gear mechanism. Before cutting, the price tag web and the rotary blade are positioned at respective reference positions. During cutting, information as to the position of the tags on the web and the rotary blade are fed to a controller which adjusts the rotation of the blade for effecting cutting at the proper positions along the web.

U.S. Pat. No. 3,982,454 to Schneider et al. discloses a common drive for moving the cutting mechanism and the web material along a travel path and an auxiliary drive which is altered in response to the position of the web to obtain a cut at the proper location.

U.S. Pat. No. 3,105,405 to Bessonny discloses a control switch for cutting sheets from a web to a predetermined length wherein a photo-electric scanning device serves to effect the necessary correction in the speed of the cutter to bring the length of succeeding sheets back to a desired length when any variation therefrom occurs. The correction is made through a system of gears.

U.S. Pat. No. 3,956,954 to Edwards discloses a rotary paper cutter device wherein a rotary blade is connected to a direct drive motor which accelerates the rotary cutting blade in response to a hole in a timing disk which passes a light sensor. After the web is cut, the light sensor transmits a signal to reverse the current flow to the drive motor thereby braking the motor to a zero velocity. The rotary blade is accelerated continuously from a starting position to the beginning of the braking position. The cut occurs intermediate these two positions. There is a sharp deceleration when the actual cut occurs.

U.S. Pat. No. 5,359,915 to Hitz discloses a cutter blade which accelerates from a ready position and rotates through a cutting angle of less than 60°. If the document is very short, the rotation is nearly continuous. With longer formats, the cutting blade rests at a ready position and then is accelerated to the appropriate cutting speed to make the cut at the appropriate time.

U.S. Pat. Nos. 4,201,102 and 4,255,998 to Rudszinat each disclose an apparatus for severing a running web using a rotary cutter. The cutter comprises two rotary blades coupled by mating gears. The motors are fluid operated. The format is dependant upon the number of indicia arranged around a disk. In order to change format, it is necessary to remove and replace the disk with another disk having a different number of indicia.

U.S. Pat. No. 4,497,229 to Carrington et al. discloses a cutter having a pair of rotary knives operated by a control having means to determine and control the position and speed of the cutter. The rotary knives are geared together by a gear train. To operate properly, the web velocity must equal the knife velocity. If a velocity error is detected, a velocity error signal is added to or subtracted from the knife output signal to increase or decrease the speed of the knife blade.

U.S. Pat. No. 5,241,884 to Smithe et al. discloses an apparatus for cutting blanks from a continuous web wherein the length of the blanks can be changed.

U.S. Pat. No. 5,257,567 to Walker et al. discloses a sheet cutting apparatus wherein a rotary cutter bar is periodically activated during a cutting cycle to rotate at a constant rotational speed to form a straight edge cut along a stationary cutting bar.

U.S. Pat. No. 4,194,421 to Knoll et al. discloses a cutting system which uses an asymmetrical control to adjust a variable-ratio transmission to synchronize the cutter rotation with the feed rollers.

Both U.S. Pat. No. 3,000,250 to Altmann et al. and U.S. Pat. No. 3,869,950 to Serra disclose non-circular cutting blades.

U.S. Pat. No. 4,618,391 to Torti et al. discloses a use of a pair of detectors to control the cutting operation of a web. One detector is upstream of a tool holder cylinder and detects the passage of a selected reference mark on a sheet.

The second detector is coupled to a general kinematic chain and provides electric pulses linked to the feed cycle of the sheets.

U.S. Pat. No. 2,877,846 to Tobey discloses the use of a photo-electric device to control the cutting of a web containing indicia by sensing the positions of an image on the web. The cutter is controlled by a signal from a photocell which senses an eye-mark on a label to be severed by the cutter.

U.S. Pat. No. 3,169,432 to Hoffman et al. discloses the use of a photo-electric means to control a cutter by sensing a margin line. The device uses a triangular rotary cutting blade having a blade at each corner of the triangle.

U.S. Pat. No. 3,945,279 to Boehme et al. discloses a device which cuts out a pattern by use of a scanner.

U.S. Pat. No. 3,811,768 to Zahn et al. discloses a device which senses the edge of a photographic print for cutting.

Both U.S. Pat. No. 3,543,620 to Hilsenbeck and U.S. Pat. No. 3,543,624 to Richards disclose a device having photocells to sense the edge of a sheet of paper to make a cut at a proper location.

Although each of the prior art references perform their intended function. The present invention provides a rotary cutter having a low inertia for rapid acceleration and deceleration which is controlled in a manner to cut sheets of paper into variable formats at high speed, while insuring that on a preprinted web the cut occurs at any desired location with respect to variable placement of the indicia on the sheet. Furthermore, the present invention can correct the cutter position for manufacturing variations in the diameter of the pinch rollers in response to signals generated by recognition of indicia on the web. Also, the format can be varied to provide either a right angle cut across the web or a cut at an angle if that is desired. Additionally, for tractor fed paper, an encoder on the tractor can be used to locate the exact position of the web along its path. The Z channel on an encoder on the rotary cutter can be used to provide a signal to the controller to indicate when a cut has been completed so that the rotation of the cutter can be stopped.

DISCLOSURE OF THE INVENTION

The invention contemplates a method and apparatus for cutting sheets of paper of variable length from a web dispensed from a paper supply, such as a roll or fan-fold supply which moves from an upstream location to a downstream location along a predetermined path to a cutter mechanism which has a rotary blade. A pair of opposed pinch rollers are located upstream of the cutter mechanism for feeding the leading end of the web. Both the rotary blade and the pinch rollers are operated by separate direct drive servo motors. A controller is provided for controlling the rotation of the rotary blade. A first sensor senses the angular position of the rotary blade and provides an input signal to the controller which is indicative of that angular position. Similarly, a second sensor senses the angular position of one of the pinch rollers and provides an input signal to the controller indicative of the angular position of the pinch roller. A format selector communicates with the controller and provides a third input signal to the controller in response to information inputted by the operator indicative of the speed and format at which the individual sheets are to be cut from the web. The computer is responsive to the first, second and third input signals to provide output signals to separate motor drivers for the rotary cutter servo motor and the pinch roller servo motor so that the cutter mechanism cuts the sheets to the desired length and the pinch rollers feed the web at the desired speed.

Suitable sensors, such as optical sensors, can be provided which sense the position of the end of the web and the position of indicia on the web for providing a further input to the controller so that the controller will cause the rotary cutter to make cuts across the web at the same position with respect to the indicia on the web with each cut. Substantially instantaneous corrections in the speed of the pinch rollers and the cutter can be made to compensate for variations in the diameter of the pinch roller and to make changes on the fly to initiate a new format upon sensing a signal generated by the indicia on the web. The term "indicia" as used herein shall include any printing, optical recognition marks (ORM), bar codes, magnetic codes, perforations or any other information placed on the web for use in directing the operation of the rotary cutter through the controller.

The controller can provide a signal to the rotary drive means to rotate the rotary cutter at a cutting speed which is constant relative to the web so that the sheets are cut at right angles. For special applications, the relative speed may be different to cut the web at different angles. The signal to the rotary cutter drive means accelerates the cutter from an initial angular position to the cutting speed just prior to the start of the cut and maintains the cutting speed through the end of the cut. The rotary cutter drive means then rotates the rotary cutter at a speed which will bring the rotary cutter to the initial angular position in time for the next cut.

A first photocell is positioned along the path between the cutter mechanism and the pinch rollers for sensing the leading edge of the web. A second photocell is positioned upstream of the pinch rollers for sensing indicia on the web. The controller provides an output signal to the rotary cutter drive means to cut the web at a predetermined location based on input signals to the controller from the first and second photocells, respectively.

The rotary cutter comprises a generally equilateral triangular support having three spaced corners and mounted axially upon a drive shaft. The equilateral triangular configuration of the support creates a rotary cutter having a low inertia but high strength. The equilateral triangular support resists bending moments in both a vertical and lateral direction with respect to the cutting blade. The cutting blade is mounted on the equilateral triangular support at one of the corners.

The pinch roller drive means includes a pinch roller servo motor operatively connected to the pinch roller drive shaft and having an encoder for determining the angular position of the pinch rollers. Similarly, the rotary cutter drive means includes a rotary cutter servo motor operatively connected to the rotary cutter drive shaft having an encoder to which a sensor is responsive for determining the angular position of the rotary cutter. A rotary cutter motor driver is connected to the rotary cutter servo motor so that the controller will provide an output signal to the rotary cutter motor driver responsive to the position of the pinch rollers to cause the pinch roller servo motor to bring the rotary cutter into proper rotational position with respect to the pinch rollers.

With the apparatus just described, several cutting operations can be provided selectively. A plain paper web can be cut to a large range of formats and through a large range of speeds, i.e., sheet per minute. On the web having indicia associated therewith, the apparatus can cut each sheet from the web at a precise location from the indicia regardless of any variation in the diameter of the pinch rollers. The indicia can provide information to the controller to make format changes on the fly from one cut sheet to the next.

In an alternative embodiment of the invention, a perforated fan-fold web of paper is fed by a positive feed mechanism, such as a tractor feed mechanism, which is located upstream with respect to the pinch rollers. The web is positioned on the tractor feed mechanism by hand and fed forward until the leading edge is in contact with the pinch rollers. The web is then fed by and through the pinch rollers so that the leading edge thereof is sensed by a photocell. At the same time, an encoder connected to the tractor feed mechanism senses the rotational position of the tractor feed mechanism. Thus, there is no need to place indicia on the web to determine the location of the next cut. Rather, the signals provided by the photocell and the encoder to the controller provides information so that the controller to determine the longitudinal position of the web so that it can provide a signal to the servo motor of the rotary cutter blade so that a final adjustment of the rotary cutter blade is made to cut the web at the appropriate location therealong.

Another feature of this alternative embodiment is that the corners of the aluminum equilateral triangular support are cut off or truncated and replaced with steel stiffening strips or bars to minimize distortion of the rotary cutter due to unequal expansion of steel and aluminum.

Another feature of this alternative embodiment is that the corners of the aluminum equilateral triangular support are cut off or truncated and replaced with steel stiffening strips or bars to minimize distortion of the aluminum support with respect to the steel cutting blade due to unequal expansion of steel and aluminum.

A further feature of this alternative embodiment is to provide a stop command to the driver for the rotary cutter in response to a signal from the Z channel of the rotary cutter encoder when the rotary cutter has just passed the cutting position after completing a cut across the web.

Additional advantages of this invention will become apparent from the description which follows, taken in conjunction with the accompanying drawings.

BRIEF DESCRIPTION OF THE DRAWINGS

FIG. 6 is a plan view of a cut sheet of paper having indicia thereon which shows the distance from the top of the sheet to the indicia and the size of the indicia window for sensing by the photocells of the paper cutting apparatus;

FIG. 7 is an enlarged fragmentary plan view of an alternative sheet of pinfeed paper having perforated strips along opposite side edges with indicia in the form of pin holes for sensing by the photocells of the paper cutting apparatus;

FIG. 8 is a graph, similar to FIG. 5, but showing the relative rotational blade velocity with respect to a change in format;

BEST MODE FOR CARRYING OUT THE INVENTION

Figure 2:
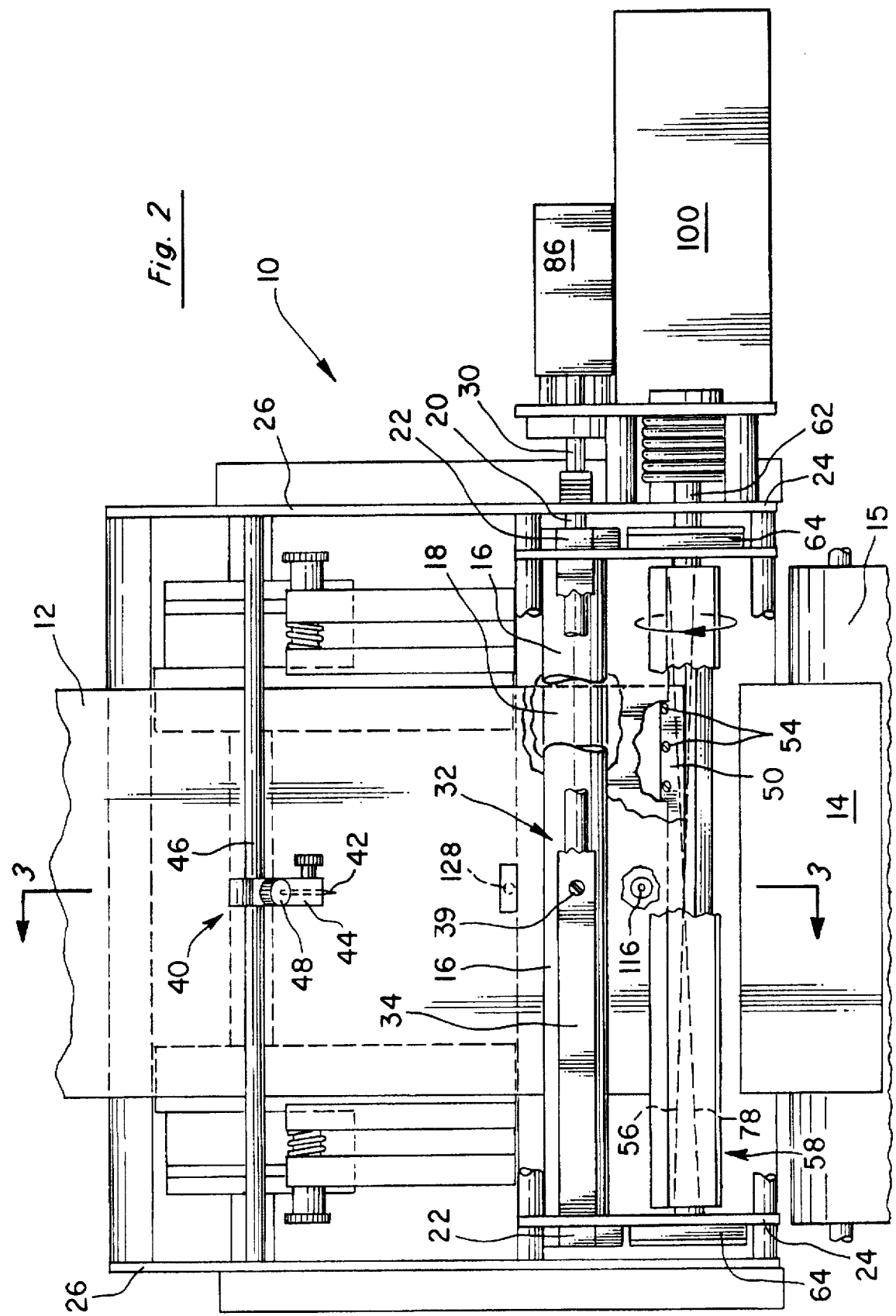
FIG. 2 is an enlarged top plan view with fragmentary cutaway sections illustrating the paper cutter assembly of FIG. 1.
Figure 3:
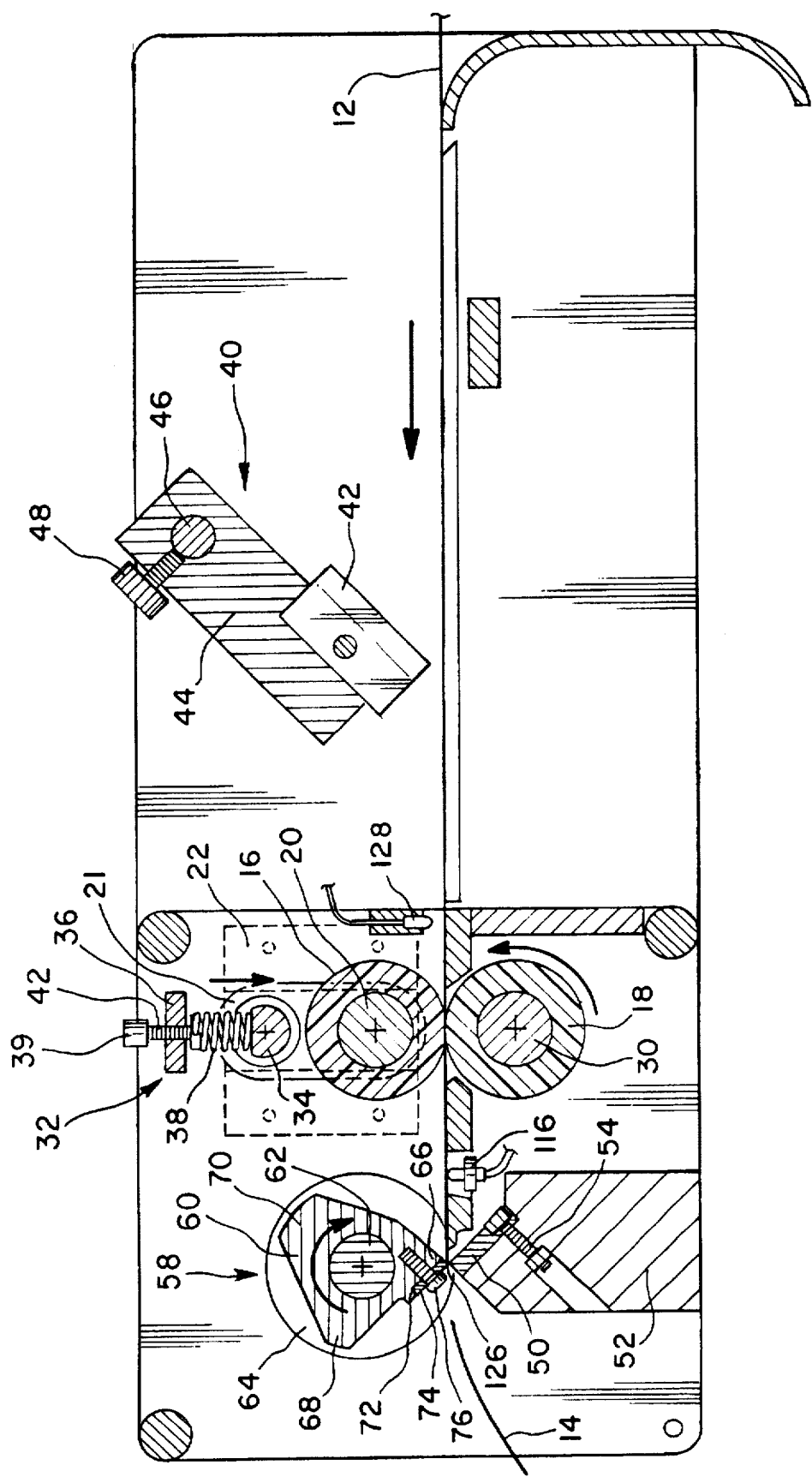
FIG. 3 is an enlarged longitudinal section taken along line 3—3 of FIG. 2, showing the relationship between the pinch rollers, the rotary cutter and the photocells.

In accordance with this invention, a paper cutting apparatus 10 is provided for cutting a continuous web 12 of paper from a supply, such as a roll or fan-folded supply (not shown), into sheets 14. These sheets 14 may be deposited onto a conveyor 15. The conveyor can convey the cut sheets to a stacker or other work station (not shown). The web is fed by a pair of upper and lower pinch rollers 16 and 18, respectively. As shown in FIGS. 2 and 3, upper pinch roller 16 is mounted on a shaft 20 which is journaled at each end in a mounting block 21 which is vertically adjustable between spaced guides 22 attached to vertical support plates 24. The vertical support plates are mounted on vertical frame members 26 extending upwardly from base 27 by means of connecting rods 28 which serve as spacers. Lower pinch roller 18 is mounted for rotation on shaft 30.

A pressure assembly 32 is positioned laterally across roller 16 for applying selective pressure thereto to control the pressure exerted by the respective pinch rollers on the web. The pressure assembly includes a pressure rod 34 extending between mounting blocks 21 and positioned below guide bar 36. A spring, such as coil spring 38, is positioned between pressure rod 34 and guide bar 36 to insert a downward force on pressure rod 34. This force is transferred through mounting blocks 21 to upper pinch roller 16 to apply the desired pressure against lower pinch roller 18 for feeding web 12 therebetween. The compression of spring 38 is controlled by adjustment screw 39.

Figure 1:
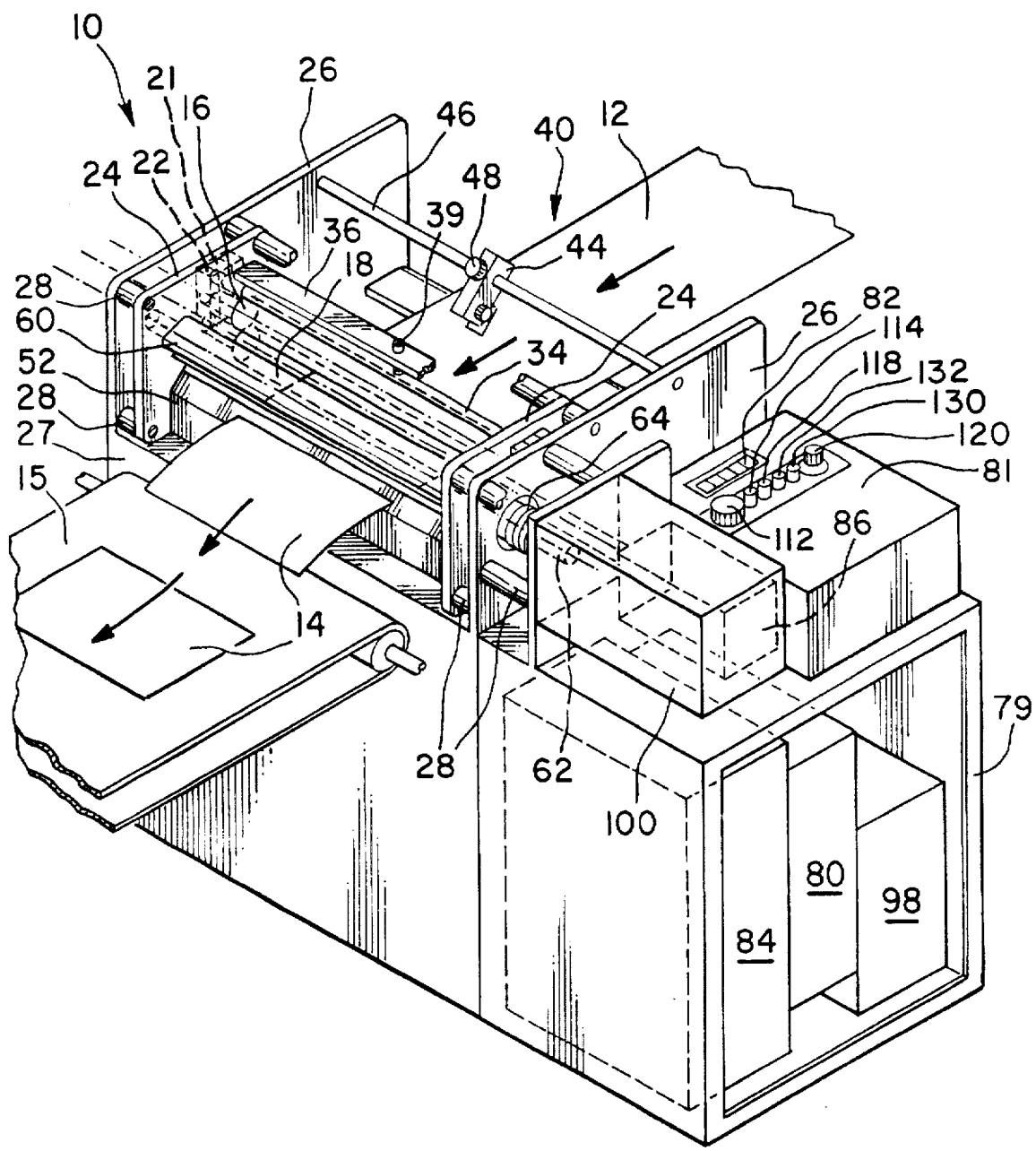
FIG. 1 is a perspective view of the paper cutting apparatus of this invention.

As best seen in FIGS. 1-3, a slitter assembly 40 is provided upstream from the pinch rollers for slitting the web longitudinally, when required. The slitter assembly includes a slitter knife 42 mounted on a support 44. The support 44 is attached for rotational movement about transverse rod 46 and is held in place by a thumb screw 48.

Downstream from the pinch rollers is a fixed blade 50 mounted on a support 52 and attached thereto by a plurality of laterally spaced screws 54. Fixed blade 50 is mounted at an angle to the directional path of web 12 as shown by dashed lines 56 in FIG. 2. A rotary cutter 58 is positioned above fixed blade 50 and has an equilateral triangular support 60, made of a lightweight material such as aluminum, mounted on a drive shaft 62 journaled at opposite ends in bearings 64 mounted on vertical support plates 24, as best seen in FIG. 2. The equilateral triangular blade support 60 has three equally spaced corners, namely, blade corner 66, vertical corner 68 and lateral corner 70, as best seen in FIG. 3. This symmetry results in a rotary cutter 58 which is of substantially less weight than a cylindrical cutter would be but has great strength. In this regard, blade corner 66 is provided with a flat recess 72 for supporting rotary blade 74 by means of laterally spaced screws 76. The structural mass of equilateral triangular support 60 between corner 66 and corner 68 resists vertical bending moments as rotary blade 74 cuts across stationary blade 50. Similarly, the structural mass of equilateral triangular support 60 between corner 66 and corner 70 resist lateral bending movements as rotary blade 74 cuts across stationary blade 50. Blade 74 is at an angle with respect to the directional path of the web opposite the angle of fixed blade 50, as shown by dashed line 78 in FIG. 2, so that a traveling point contact is created across web 12 during each revolution of rotary cutter 58.

A housing 79 attached to the side of the paper cutting assembly, as shown in FIG. 1, is provided for controller 80.

A format selector 81 is mounted on housing 79 and has a plurality of format controls and a viewing screen 82 to show the format selected, as will be more fully discussed below.

A motor driver 84 is mounted in housing 79, which in turn is connected to lower pinch roller servo motor 86 attached to the end of drive shaft 30 of lower pinch roller 18. This is best shown diagrammatically in FIG. 4. An encoder 88 is attached to the drive shaft 30 and has openings 90 therein for transmitting a signal from a radiant energy signal source 92 to a receiver 94. The receiver 94 provides an electrical input signal through wire 96 to controller 80 in response to a signal received from source 92 which is indicative of the angular position of lower pinch roller 18. It will be understood that other types of encoders, such as those using magnetic markers or bars spaced round the periphery encoder disk 88 could also be used to create the electrical input signal to controller 80.

A motor driver 98 is also mounted in housing 79 and is connected to rotary blade servo motor 100 which in turn is connected to shaft 62 for rotating the rotary cutter 58. Also attached to shaft 62 is an encoder disk 102 having openings 104 therein. A radiant signal source 106 is provided for transmitting a signal through the openings to a receiver 108 which transmits an input signal by means of wire 110 to the controller indicative of the angular position of the rotary cutter. As stated previously with respect to the pinch rollers, an alternative encoder as would be apparent to one of ordinary skill in the art could be used.

The structure just described provides an apparatus which can accomplish a variety of cutting functions. The speed and timing of the location of the rotary cutter during is angular rotation can be varied by operator input through controls in a format selector connected to the controller so that the format of the sheets and the speed at which they are cut can be changed over a wide range of desired formats and speeds without shutting down the operation of the apparatus. In other words, by merely dialing in the desired values, the rotation of the rotary cutter will be modified to immediately cut the next sheet to the new desired format and at the new speed. A detailed discussion of the mechanics for accomplishing this is set forth below.

VARIABLE FORMAT PLAIN PAPER CUTTING OPERATION

A key to the present invention is that in order to adapt the geometrical properties of the off-set cutter to a variable format operation, it is necessary that the relationship between paper speed and cutting speed be kept as a constant for all formats. The only factor influencing this constant is the linear speed of the paper itself. This is a accomplished through the use of the direct drive servo motors 86 and 100 in response to commands from controller 80 so that the angular rotation of rotary cutter 58 during cutting only represents a fraction of the complete rotational cycles so that the remainder of the cycle can be devoted to format generation. In particular, it is desirable that the angular portion of the rotation of rotary cutter 58 in which cutting takes place be no more than 90° in any one 360° rotation.

Figure 5:
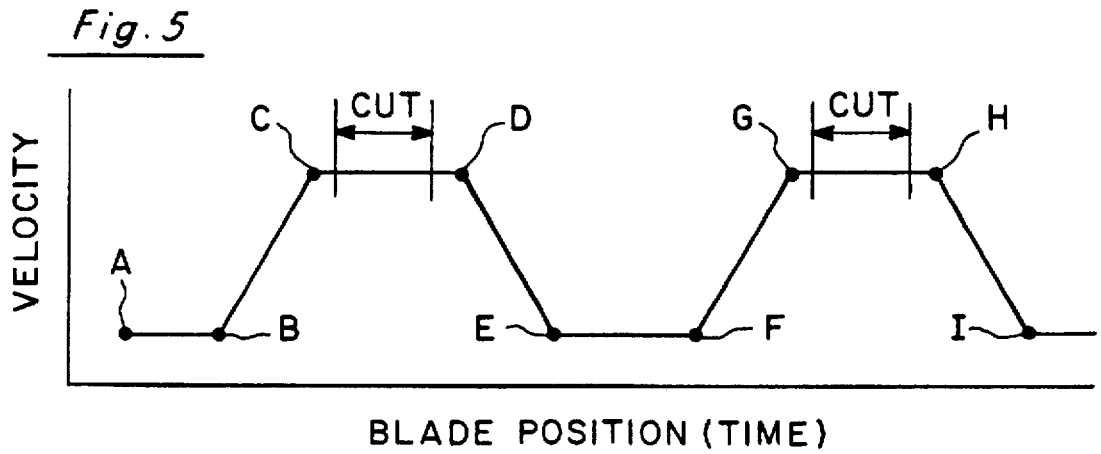
FIG. 5 is a graph showing the relative angular blade velocity with respect to its rotational position.

This will be apparent by looking at FIG. 5 which shows two complete rotations of the cutter in the velocity/time curve. Between points A and B, the rotary cutter 58 is moving at a slow rate of speed in the non-cutting portion of the cycle. At point B, the controller receives a signal from encoder 87 that the paper web has advanced to a position wherein the rotary cutter 58 must be brought up to cutting speed. The controller 80 causes motor driver 98 to increase the rotational speed of rotary cutter 58 through servo motor 100 to bring it up to cutting speed at point C. It will be noted that this speed is obtained prior to the cut. This speed is maintained from point C to point D, this latter point being beyond the cut. Thus, a constant and correct speed is maintained throughout the cut to create a right angle cut across the web 12 to sever a sheet 14. When controller 80 receives a signal from encoder 101 that point D has been reached, it will reduce the speed of motor driver 98 and servo motor 100 to drop the cutter speed from point D to point E. The controller will maintain a lower rotational speed from points E to F during the non-cutting cycle. When the next signal is received from encoder 87 that the web is again approaching the cutting position, the controller, through motor driver 98 and servo motor 100, will increase the speed of rotary cutter 58 from point F to point G and will maintain this speed from point G through point H for the next cut. After that cut is made as indicated by a signal from encoder 101, the controller will again reduce the speed of rotary cutter 58 from point H to point I.

In order to accomplish the foregoing, an initialization procedure must be undertaken. Referring to FIGS. 1 and 5, the operator rotates format knob 112 on format selector 81. The format length selected is displayed in window 82. This sets the parameters within controller 80 for the correct relationship between the rotation of the pinch rollers, for the required paper quantity, and the rotation of the rotary cutter.

Next the operator depresses home button 114 which causes pinch roller 16 and 18 to move web 12 forward through a slow motion command to motor driver 84 of servo motor 86, which controls the pinch rollers. The leading edge will be detected by home photocell 116 which provides an input signal to controller 80. This input signal causes the controller to initiate a programmed slow motion back and forth movement of the pinch rollers. This is done to ensure that the web is positioned correctly. Simultaneously, the controller issues a programmed motion command to motor driver 98 of servo motor 100 to position the rotary cutter 58 with the rotary blade at the 12 o'clock position. As this is done, the pinch roller encoder 87 and the rotary cutter encoder 101 count the pulses during their respective rotation to correctly position the pinch rollers and the rotary cutter, respectively.

After this initialization procedure is completed, the operator presses start button 118 whereupon the controller 80 controls the operation of servo motors 86 and 100 in accordance with the format entry made during the initialization process. Thus, the apparatus operates to cut the web into sheets of the desired length. The speed at which the sheets are cut can be changed by the operator adjusting potentiometer 120 on format selector 81. The setting of potentiometer 120 is sent to controller 80 as an analog input which, in turn, is sent to servo motor 86 to drive pinch rollers 16 and 18 at the desired speed. The change in speed has no other influence on the apparatus but to have the signals corresponding to the desired sequence to be processed faster.

INDICIA ACTIVATED PAPER CUTTING OPERATION

As will be apparent from the foregoing, the signals provided to the controller to determine the point at which the cutter should cut the web into sheets, is based on the number of pulses sensed by the encoders 87 and 101. However, due to manufacturing tolerances the diameter of the pinch rollers varies slightly. This can create a slight error in the length of paper being measured during each revolution of the pinch rollers. When plain paper is being cut into sheets, this variation per sheet is so small as to be negligible. However, when the web contains printing, such as billing statements, if this error is allowed to accumulate, the cutting position will drift over time and will occur in an unacceptable location, such as across the printing.

By way of illustration, it can be seen in FIG. 6 that a sheet of paper 14 can be provided with indicia, such as printing 122 or an optical recognition mark (ORM) 124 located a distance D from the top of the sheet. Both the printing 122 and the ORM 124 have been illustrated as being on the same sheet for convenience. However, in most circumstances either the printing 122 or the ORM 124 would be on the same sheet, but not both. On sheets having the printing, printing 122 will have a window W of a predetermined length for a purpose to be discussed below.

The initialization procedure for this operation begins as described above wherein the leading edge of the paper has been fed through pinch rollers 16 and 18 until it has been sensed or read by home photocell 116 and rotary cutter 58 has been positioned with rotary blade 74 at the 12 o'clock position. Next, the paper is advanced until it is past cutting point 126, shown in FIG. 3, by a distance equal to the length of the first sheet of paper. During this advancement, the pulses are read by controller 80 from encoder 87 and this number is stored in the controller for determining the appropriate location for each cut. The rollers then advance the paper further until the printing 122 or optical mark 124 on the second page is read by ORM photocell 128. At this point, depending on format, the rollers can either advance the paper or retract it before proceeding with a production cycle. Thus, it can be seen that the exact location of the printing 122 or ORM 124 can be located vis-a-vis the leading edge of the sheet. Since the distance between cutting point 126 and photocell 116 is known, this distance can be translated into a known number of encoder pulses that will occur in moving the web this distance.

The second distance which is important is the distance D between the leading edge of the sheet and the indicia, such as printing 122 or ORM 124. This distance also translates to a corresponding number of pulses, as discussed above. Now, if ORM photocell 128 is located at least one format distance for the shortest format to be cut from cutting point 126, when ORM photocell 128 detects an optical mark, it will cause the blade to reposition itself before the cut related to that mark occurs. In other words, if a normal sheet length is, for example, 1,000 pulses, the reading of an optical mark will trigger a separate signal that will cause controller 80 to override its own normal counting sequence and will provide an output signal to motor driver 98 in order to reposition the blade even if the number of counts for a given sheet is not the previously programmed 1,000 pulses. These parameters are stored in controller 80 by depressing the data acquisition ORM button 130 on format selector 81.

Based on the foregoing description, it can be seen that the system works as follows. With both the distances between cutting point 126 and ORM photocell 128 and the distance D from the leading edge of the sheet to the printing 122 or ORM 124 being known, a signal will be provided to controller 80 at the moment ORM photocell 128 detects the printing 122 or ORM 124 causing the blade to reposition itself so that the rotary cutter 58 will cut the paper at a distance D ahead of indicia.

Because of the extreme flexibility of the system, the blade can be repositioned anywhere in the cycle of rotation, except during the constant velocity cycle, previously discussed.

This means that the basic format entry is relied upon as the normal operation and that the blade is repositioned in response to the pinch roller cycle rotation. In other words, the distance between cutting point 126 and ORM photocell 128, the distance D from the leading edge of the paper to the indicia, and the window distance W are all related to the accuracy of the pinch roller readings and the rotary cutter 58 is slaved to this data in relationship to a normal operating cycle if there are no sensed errors.

A necessary feature of the system is the ability of the ORM photocell 128 to be placed in an inoperative condition after reading the optical reader or indicia area so that it will not respond to any other indicia on the paper. This is done by counting the number of pulses equal to window distance W and activating the photocell only during these specific pulses.

It is contemplated that the present invention can be used with pinfeed paper. As shown in FIG. 7, sheet 14 is provided with perforated strips 14' along opposite side edges thereof. These strips 14' have a plurality of pinfeed holes, such as pinfeed holes 131. ORM photocell 128 can be positioned to read these pinfeed holes or the pinfeed teeth extending through the pinfeed holes. Therefore, with a known distance D' from the leading edge of sheet 14 and by providing a window distance W', the input signal to controller 80 from ORM photocell 128 can be used to adjust the position of the rotary cutter 58 during its cycle so that the sheet is cut at a precise location. This is accomplished in the same manner as described above with respect to the use of printing 122 and/or ORM 124 shown in FIG. 6. An additional advantage of this invention is that the apparatus permits the feeding of either pinless paper or pinfeed paper without incurring unnecessary time and costs in changing over from one type of paper to the other. All that is required is that the pinfeed tractor (not shown) that is required for pinfeed paper is not used for pitiless paper.

Another capability of the invention, utilizing the indicia activated paper cutting operation, is the ability to change formats on the fly, i.e., to change from one format to the next from one cut to the next as shown in FIG. 8. The operation discussed above for blade repositioning is used for this application as well. The only required assumption is that regardless of the format, the ORM will be located for any given format at the same distance from the leading edge of the paper. The ORM can be a bar code signal which provides information as to both its own location on a sheet and information as to the format of the sheet. Provided there is at least one format distance for the smallest format to be processed between cutting point 126 and ORM photocell 128, the leading edge of the optical mark will cause a new cycle to start after the preceding one has been activated. More specifically, as shown in FIG. 8, sometime before the end of the cut for the last 8" sheet, for example, an optical mark will be sensed by ORM photocell 128, such as at point J. Point J could be anywhere but will be before the completion of the cut of the 8" paper. This will cause controller 80 to provide output signals in order to drive rotary cutter 58 at the appropriate speed to position it to make the next cut at a length for a different format, such as a 4" format. Somewhere during this cycle but before the end of the cut for the 4' format a point K will be reached where optical reader 118 will again sense an optical reader mark for the next sheet which will send a signal to the controller indicative of the format for that next sheet to be cut which may be the same format as the last sheet or may represent a totally new format.

A stop button 132, provided on format selector 81, is, required for some operations in order to discontinue the cutting of additional sheets within the shortest possible time after the stop command has been initiated. However, it is impractical to interrupt a cutting cycle in the middle of its sequence. Therefore, the stop command must be validated or undertaken only after the cycle in progress has been completed. When stop button 132 is depressed, an input signal will be sent to controller 80 and compared to the signal from encoders 87 and 101 to determine the position of the pinch rollers 16 and 18 and the rotary cutter 58 in the cutting cycle. In this way, the operation of the apparatus can be concluded at the end of one cutting cycle but before the next cutting cycle begins. Also, the rotary cutter can be brought back to the initial position wherein the rotary blade 74 is returned to the 12 o'clock position.

TRACTOR FEED PAPER CUTTING OPERATION

Figure 9:
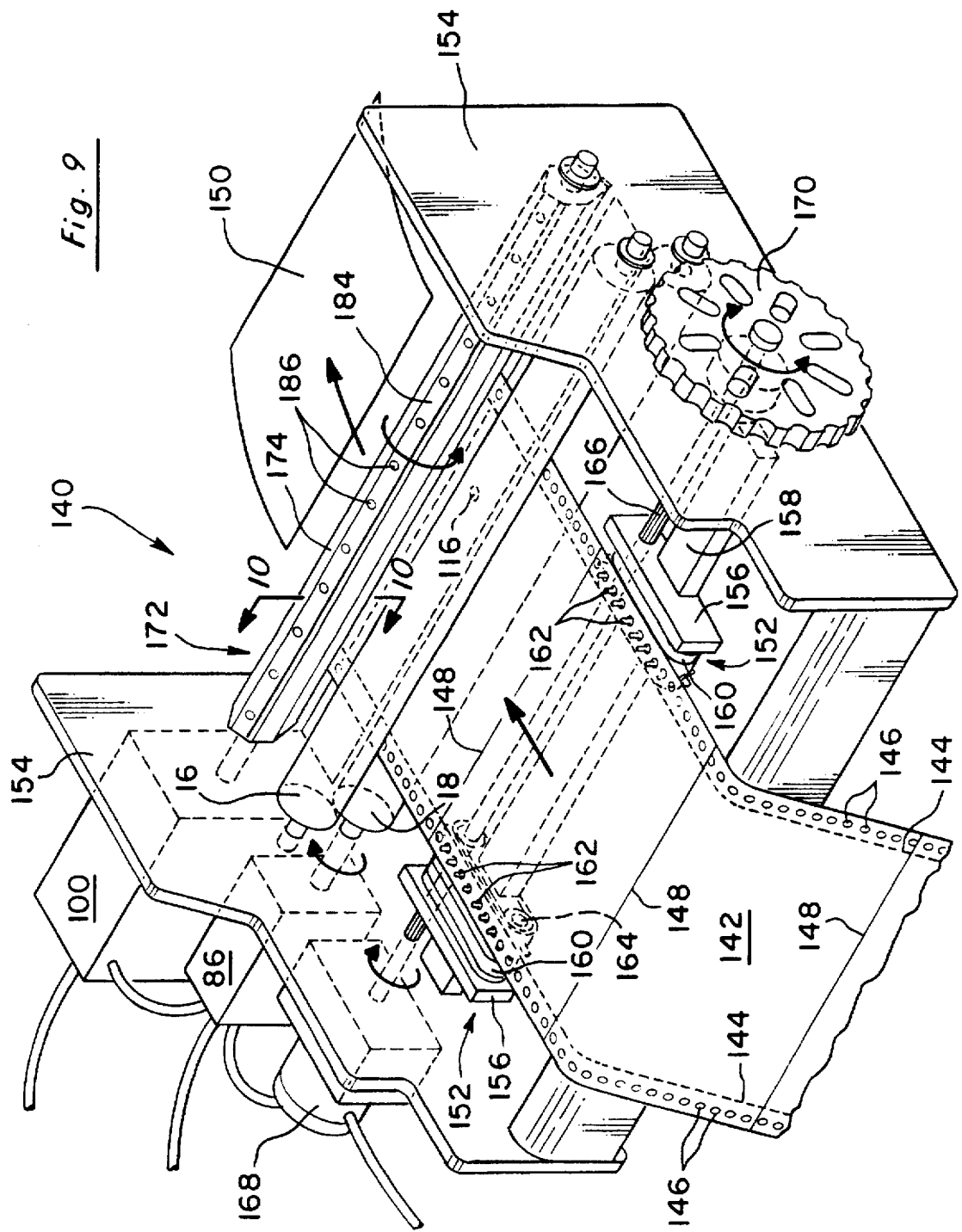
FIG. 9 is a perspective view of an alternative embodiment of this invention showing a tractor feed mechanism which has an encoder for feeding a perforated web.

An alternative embodiment of a paper cutting apparatus 140 is shown in FIG. 9 which has particular application for feeding a web 142 having perforated strips 144 along each edge thereof which have a plurality of pin holes 146 therein. The web may be conventional fan folded computer paper having lateral score lines 148 thereacross for separating the web into separate sheets of a predetermined size. Therefore, it is important to be able to make precise cuts along the score lines 148 to separate the web into separate sheets 150. Slitters (not shown) can be provided to separate the perforated strips 144 from web 142 as it passes through paper cutting apparatus 140 so that they are no longer connected to the individual sheets, such as sheet 150, when they are discharged.

Conveniently, paper cutting apparatus 140 is provided with a standard positive feed mechanism for positioning and guiding the web toward pinch rollers 16 and 18, such as pin feed tractor 152 mounted between spaced vertical frame members 154, as shown. Each side of the tractor 152 has a tractor support 156 mounted on a lateral support 158 extending between vertical frame members 154. Each side of tractor 152 includes an endless belt 160 having a plurality of outwardly projecting pins 162 for engagement with pin holes 146 of web 142. Each endless belt 160 is mounted on a rotatable upstream stub shaft 164 respectively mounted on tractor support 156 and a downstream spline shaft 166 which is mounted for rotation between vertical frame members 154. Conveniently, the respective sides of tractor 152 can be adjusted laterally along spline shaft 166 to accommodate different web widths. Also, the tractor 152 will be provided with a hinged cover (not shown for clarity of illustration) which will be raised to place the web so that the pin holes 146 are engaged with pins 162, whereupon the hinged cover is lowered to extend across the pins to assure that the pin holes do not slip off of the pins.

An encoder 168 is connected to one end of spline shaft 166 and is driven thereby. The other end of spline shaft 166 is fixedly connected to a hand wheel 170. To initialize operation of paper cutting apparatus 140, the operator first places the web on the tractor 152, as shown in FIG. 9, with the leading edge between the tractor and pinch rollers 16 and 18. Next, the operator turns hand wheel 170 in a clockwise direction to rotate belts 160 of tractor 152 to advance the web 142 until the leading edge thereof engages and is positioned between the pinch rollers. After the start button 118 is pressed to initialize the apparatus, the pinch rollers will pull the web 142 forward moving it in the downstream direction. As web 142 moves forward, the leading edge thereof will pass over photocell 116 which sends a signal to controller 80 indicating that the leading edge is in that location. Simultaneously, controller 80 will receive a signal from encoder 168 which is indicative of the angular rotational position of tractor 152. Since the position of web 142 is fixed by pins 162 with respect to tractor 152, the controller can determine the exact longitudinal position of the web and adjust the rotational speed and location of rotary cutter 172 located downstream of pinch rollers 16 and 18 to make a precise cut along each lateral score line 148 of web 142 in the manner described above with respect to the previous embodiment. It should be noted that the tractor 152 does not have an independent drive mechanism but rather it is driven by the web 142 being pulled in the downstream direction by pinch rollers 16 and 18. Thus, since the angular position of tractor 152 is known, the exact location of web 142 also is known at all times without the need to place indicia on the web to determine its location. From the foregoing, it can be seen that paper cutting apparatus 140 can be used to cut conventional fan-folded paper having perforated strips along each side edge into separate sheets along lateral score lines 148.

Figure 4:
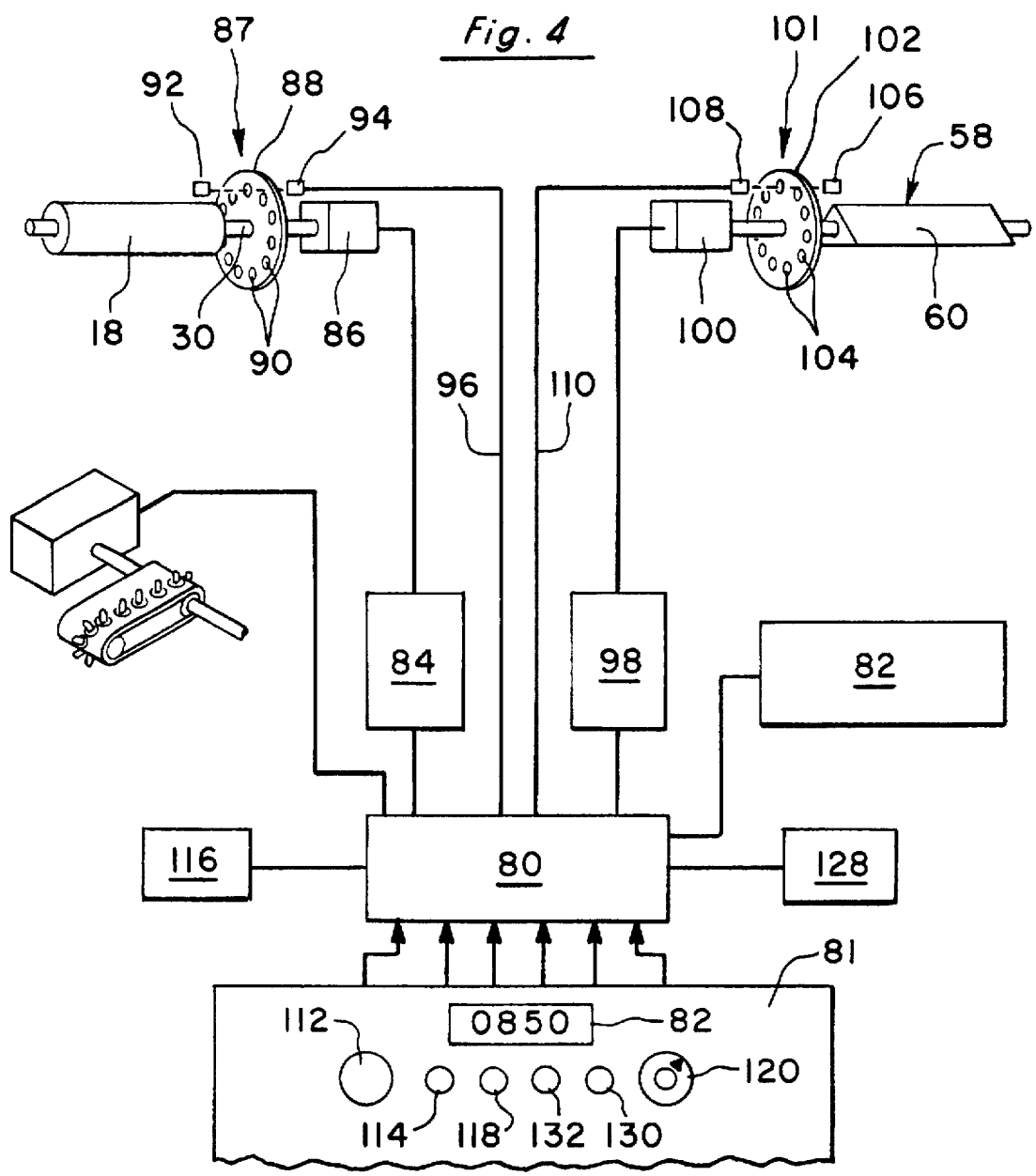
FIG. 4 is a diagrammatic view of the controls for the paper cutting apparatus.
Figure 11:
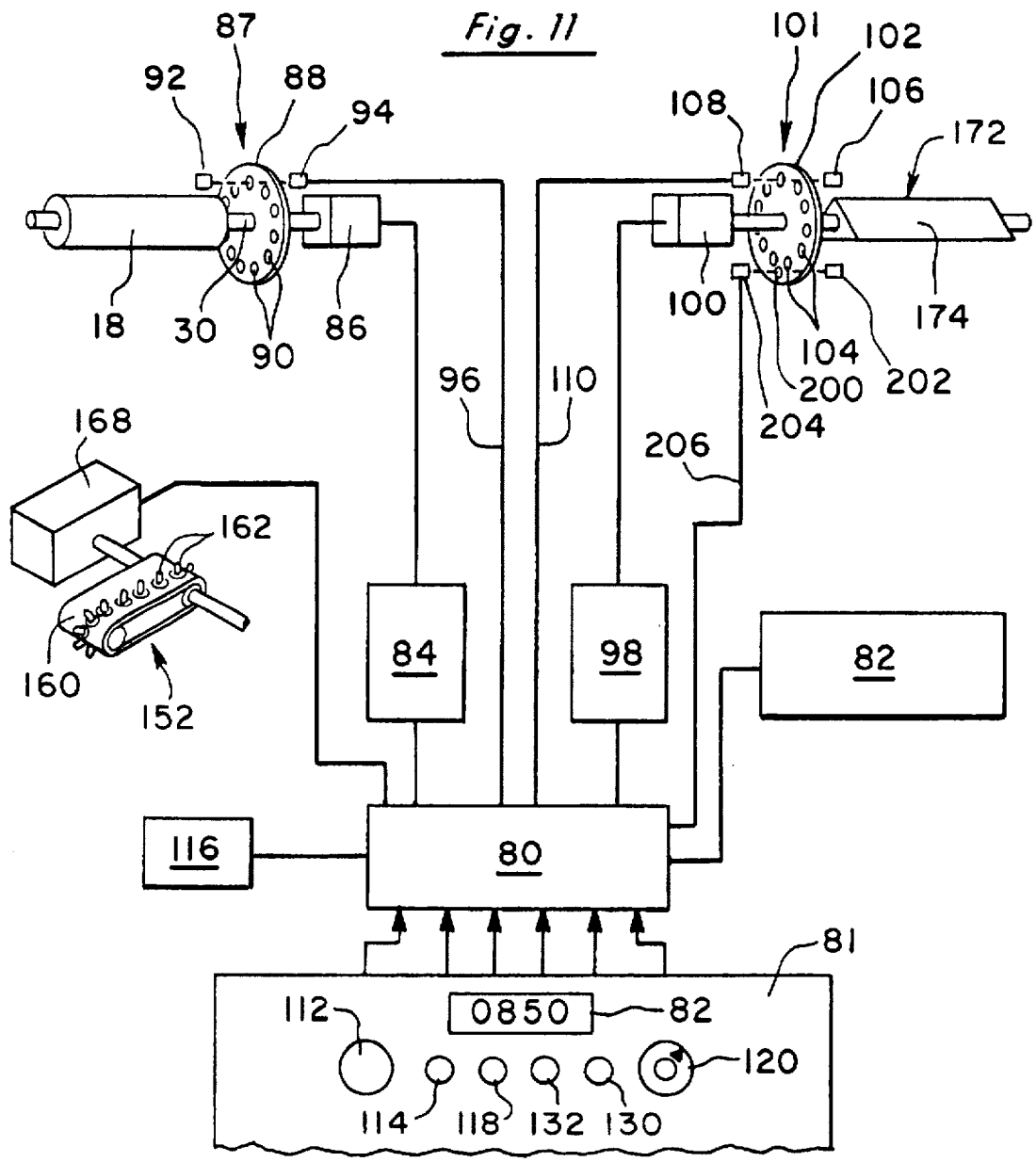
FIG. 11 is a diagrammatic view of the controls for the paper cutting apparatus of FIG. 9.

The controls for paper cutting apparatus 140 are diagrammatically shown in FIG. 11 and function as described with respect to FIG. 4 except that encoder 168 replaces the function of photocell 128 in the first embodiment. That is, since encoder 168 senses the exact position of tractor 152 and web 142, there is no need for indicia on the web and therefore no need for photocell 128. More specifically, a first sensor, such as encoder 101, senses the angular position of rotary cutter 172 and provides a first input signal to controller 80. A second sensor, such as encoder 87, senses the angular position of one of the pinch rollers and provides a second input signal to controller 80. A third sensor, such as encoder 168, senses the angular position of tractor 152 which identifies the longitudinal location of the web. Format selector 81 provides a fourth input signal to controller 80 indicative of the speed and format for individual sheets to be cut from web 142. Photocell 116 provides a fifth input signal to the controller in response to sensing a leading edge of the web passing thereover. Controller 80 is response to these signals to provide first output signals to a rotary cutter driver 98 to the pinch roller servo motor 100 so that rotary cutter 172 cuts the sheets to a desired length and the pinch rollers feed the web at a desired speed.

Figure 10:
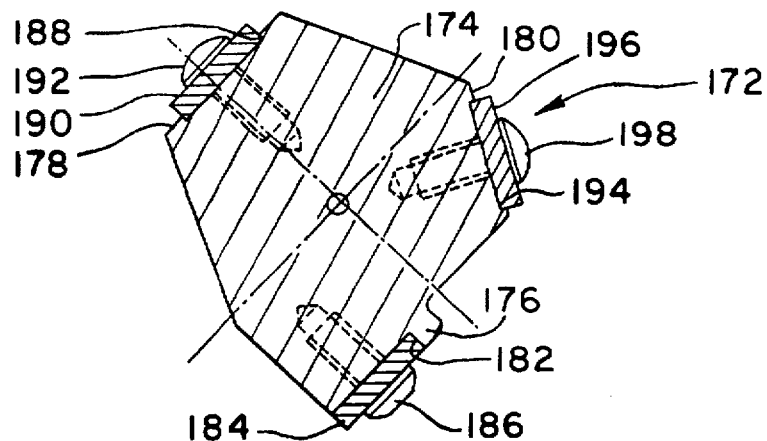
FIG. 10 is an enlarged vertical section, taken along line 10—10 of FIG. 9, showing details of the rotary cutter support.

When the paper cutting apparatus of this invention runs for a substantial period time, the rotary cutter becomes hot. Since the aluminum triangular support expands at about twice the rate of the steel rotary blade, the rotary cutter will develop a curve when it becomes hot which causes the rotary steel blade to no longer come into contact with the stationary blade. Rotary cutter 172, shown in FIGS. 9 and 10, minimizes this problem. As best seen in FIG. 10, an aluminum generally triangular support 174 is provided having a truncated blade corner 176, a truncated vertical corner 178 and a truncated lateral corner 180. Blade corner 176 has a longitudinal recess 182 which receives steel rotary blade 184 and is positioned so that the edge thereof can make cutting contact with fixed blade 50 button through, shown in FIG. 3. Steel rotary blade 184 is held in place by a plurality of longitudinally spaced fastening means, such as screws 186. Vertical corner 178 has a longitudinal recess or channel 188 for receiving a steel strip or bar 190 which is of approximately the same size and weight as steel rotary blade 184. Steel bar 190 is held in place by a plurality of longitudinally spaced fastening means, such as screws 192. Similarly, lateral corner 180 has a longitudinal recess or channel 194 for receiving a steel strip or bar 196 which is held in place by a plurality of longitudinally spaced fastening means, such as screws 198.

Steel bar 196 is of the same size and weight as steel bar 190 and rotary cutting blade 184. Also, each bar is the same weight as the aluminum which was removed in truncating the respective corners of aluminum triangular support 174. With this arrangement, the expansion of the aluminum triangular support 174 is uniform in all directions because of the positioning of steel rotary blade 184, steel bar 190 and steel bar 196 at the respective truncated corners thereof. This arrangement minimizes the possibility that steel rotary blade 184 will not at all times come into contact with stationary blade 50 in the desired cutting relationship.

After each cut, the rotary cutter must be stopped at the correct location so that it can be accelerated to the proper speed in order to make the next cut at the proper time. The factors which affect the time period to stop the rotary cutter is the time required for the processor to process the stop command and the inertia of the rotary cutter which must be overcome. Typically, the stop signal is initiated from the encoder on the pinch rollers. However, this signal cannot be processed while the pinch rollers are completing their rotation for the format for the last sheet cut. Thus, there is a delay in the processing of the stop signal which results in continued angular rotation of the rotary cutter. This may result in the rotary cutter rotating too far before it can be stopped. Therefore, it may not be able to accelerate from this stopped position to a sufficient speed to make a right angle cut for the next cut to the made across the web.

As shown in FIG. 11, the encoder disk 102 is provided with an opening 200 which is positioned with respect to rotary cutter 172 so that just after a cut has been made, a signal is transmitted from signal source 202 to a receiver 204. This signal represents the Z channel of the encoder and provides a signal through wire 206 to controller 80. Since this signal is not tied into the format controlling the pinch rollers, it can be received and processed faster by controller 80 than can a signal from pinch roller encoder 87. Thus, the braking operation of rotary cutter 172 can be initiated sooner so that the rotary cutter is brought to rest after a smaller angular rotation than is otherwise possible.

By way of example, if the cut is made at the 6 o'clock position and the stop signal is taken from pinch roller encoder 87, this may not occur until rotary cutter 172 has reached the 9 o'clock position. In this case, it may not the possible to stop the rotation of the rotary cutter until it has passed the 4 o'clock position. Thus, there is not enough angular distance between the 4 o'clock position and the 6 o'clock cutting position for the next cut to bring the rotary cutter back up to the appropriate speed for making the next cut. Should that occur, the next cut will not the at a right angle to the web.

On the other hand, when the stop signal is taken from the Z channel of rotary cutter encoder 101, this will occur at about 6:30 o'clock so that the rotary cutter 172 can be stopped before the 4 o'clock position is reached. This will provide sufficient angular distance for the start-up for the next cut so that the rotary cutter is brought up to proper speed before it reaches the 6 o'clock cutting position.

From the foregoing, the advantages of this invention are readily apparent. A method and apparatus for cutting sheets of paper of variable length from a continuous web of paper has been provided. A pair of opposed pinch rollers are located upstream of a cutter mechanism having a rotary cutter. Both the rotary cutter and pinch rollers are operated by separate direct drive servo motors. A first sensor senses the angular position of the rotary cutter. A second sensor senses the angular position of the pinch rollers. Both sensors provide input signals to the controller indicative of their relative positions. A third input signal is provided to the controller by the operator through a format selector which determines the speed and format for individual sheets to be cut from the web. In response to these signals, the controller guides the rotary cutter and pinch rollers at the desired speed and timing to cut the web to the desired format lengths.

Optical sensors sense the position of the end of the web and in the first embodiment the position of preprinted indicia on the web. This information is inputted to the controller so that precise cuts can be made with respect to the position of the indicia for each cut sheet of paper. Substantially instantaneous corrections in the speed of the rotary cutter can be made on the fly to compensate for variations in the diameter of the pinch rollers to initiate a new format upon sensing a signal from an optical mark on the web.

In the second embodiment, a tractor feed is used for fan-folded paper with perforated side strips. An encoder on the tractor senses the rotational position thereof. The signal from the tractor encoder together with the signal from the optical sensor for sensing the leading edge of the web identify for the controller the longitudinal position of the web without the need for indicia. The signal from the tractor encoder can be used by the controller to make corrections in the rotary cutter rotation to assure that each cut across the web is in the correct location.

A stop signal can be taken from the Z channel of the rotary cutter encoder so that the rotary cutter can be stopped to allow sufficient angular distance for acceleration to the desired cutting speed for the next sheet to be cut from the web.

This invention has been described in detail with reference to a particular embodiment thereof, but it will be understood that various other modifications can be effected within the spirit and scope of this invention.

I claim:

1. A method of consecutively cutting sheets of variable length and at variable speed from a continuous web fed from an upstream location to a downstream location along a predetermined path to a cutter mechanism having a fixed blade at a first angle to the path and having a rotary blade at a second opposite angle to the path so that during its annular rotation through a cutting arc, the rotary blade makes moving cutting point contact with the fixed blade to make a cut laterally across the web to cut the web into the sheets, said method comprising the steps of:

feeding the web by means of pinch rollers past the cutting mechanism at a speed indicative of a number of sheets to be cut per unit of time;

varying the speed of the pinch rollers to vary the number of sheets cut per unit of time;

sensing a relative rotational position between the rotary blade and the pinch rollers;

rotating the rotary blade at a first constant rotational speed through the cutting arc so that the relationship of the web speed with respect to the movement of the cutting point along the fixed blade results in the formation of a predetermined angular cut across the web;

rotating the rotary blade at a second variable rotational speed from the end of the angular rotation through the cutting arc in response to the sensed relative rotational position of the rotary blade to the pinch rollers to position the rotary blade at a predetermined location prior to the beginning of a next angular rotation through the cutting arc for making a next cut at a desired location along the web to cut sheets to a desired length;

simultaneously controlling the rotation of the pinch rollers and the rotation of the rotary blade to simultaneously vary both the speed at which the web is cut into sheets and the format of each sheet;

providing a first sensor upstream from the cutter mechanism at a predetermined distance;

determining a format of each sheet to be cut from the web which corresponds to the indicia positioned thereon;

sensing the position of a leading edge of the web by the first sensor as it moves along the path;

sensing the position of the indicia adjacent the leading edge with a second sensor; and cutting the web at a desired position indicative of the sensed position of the leading edge and the adjacent indicia.

2. A method, as claimed in claim 1, wherein: the indicia is printing.

3. A method, as claimed in claim 1, wherein: the indicia is an optical recognition mark.

4. A method, as claimed in claim 1, wherein: the indicia is associated with a pinfeed hole.

* * * * *